Aug. 14, 1956  I. Z. SMOKER  2,758,702
SLIP ON FLIGHT FOR ENDLESS CONVEYOR
Filed Nov. 26, 1952.  3 Sheets-Sheet 1
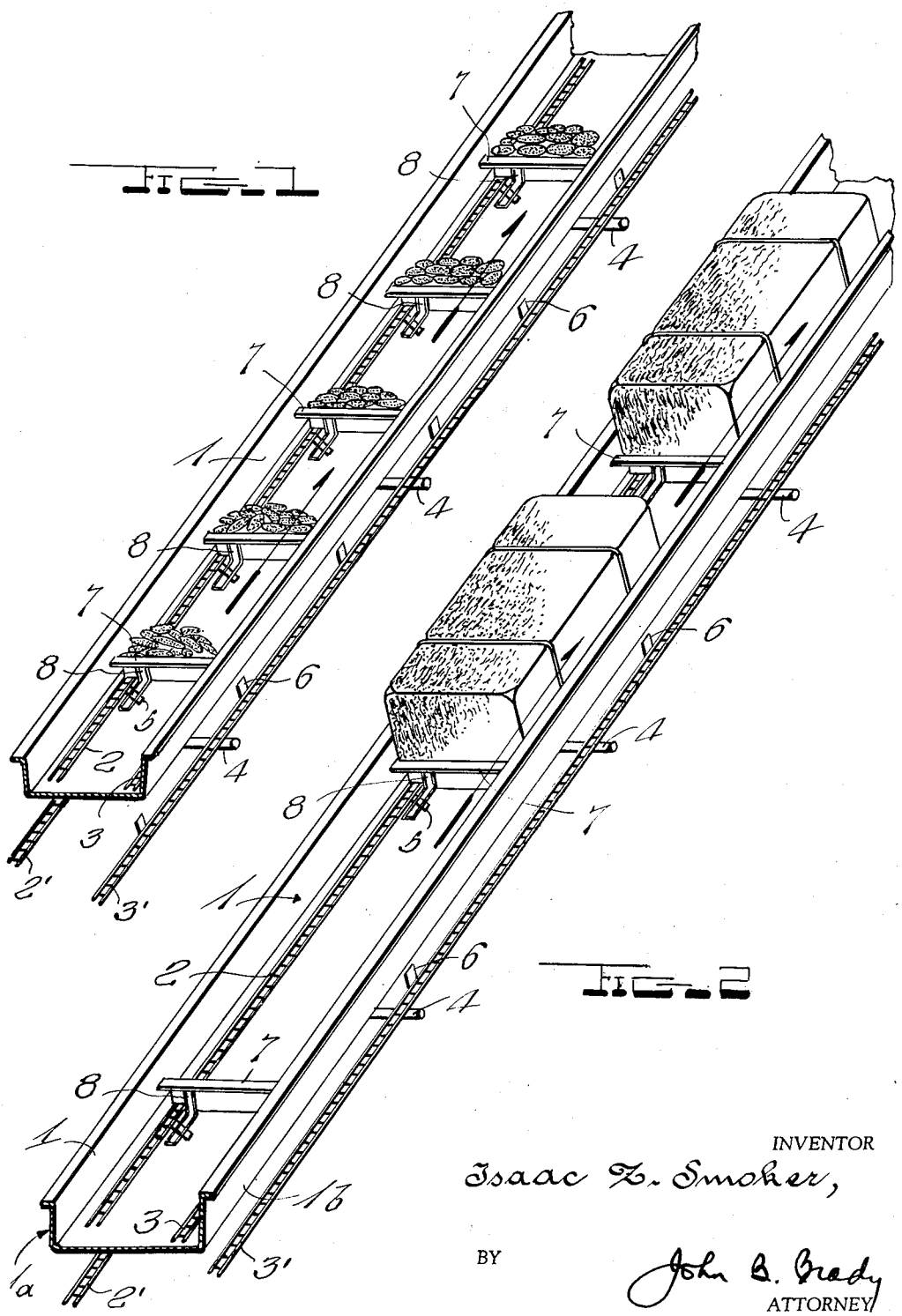
INVENTOR
Isaac Z. Smoker,
BY
John B. Brady
ATTORNEY

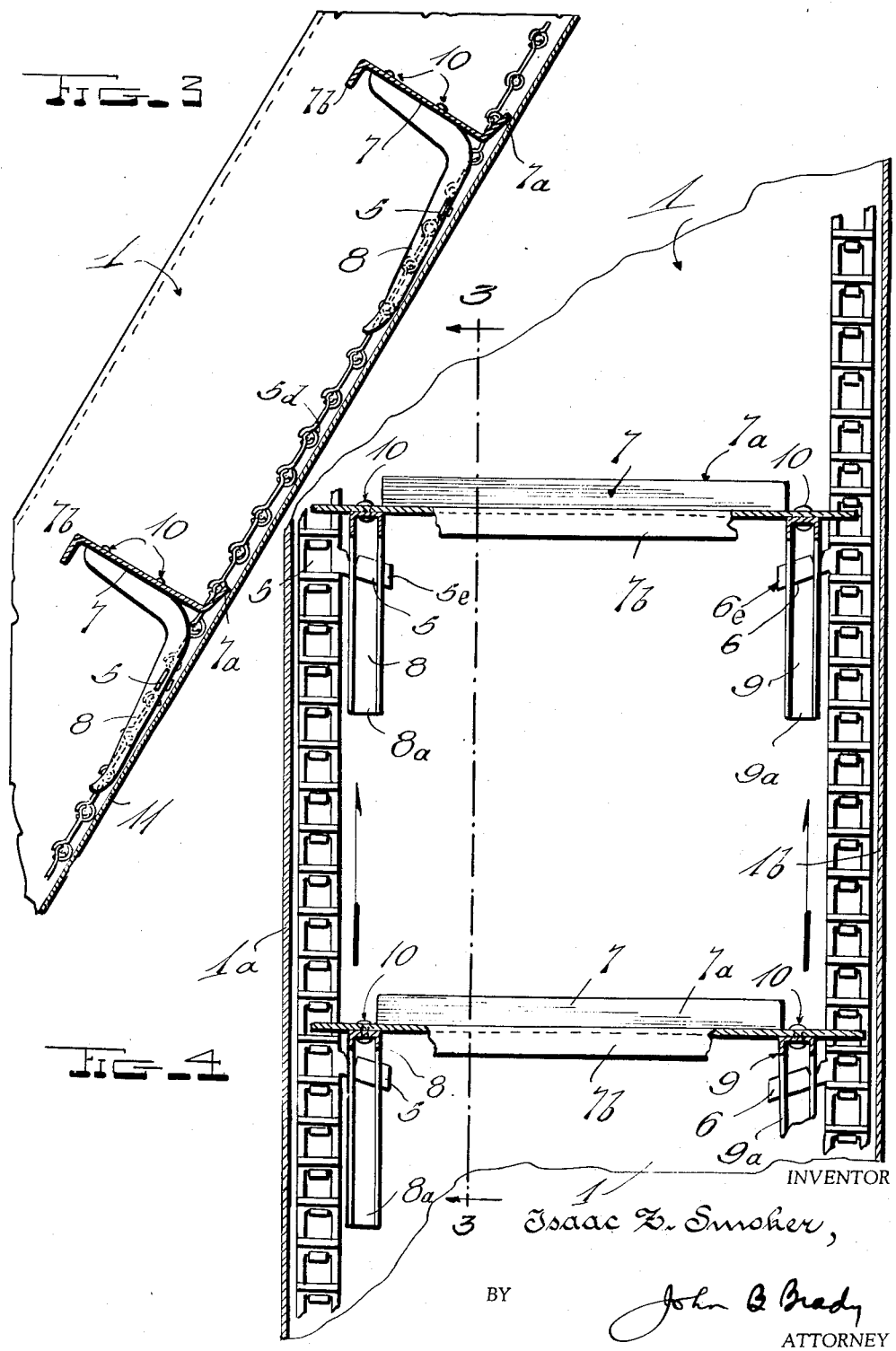

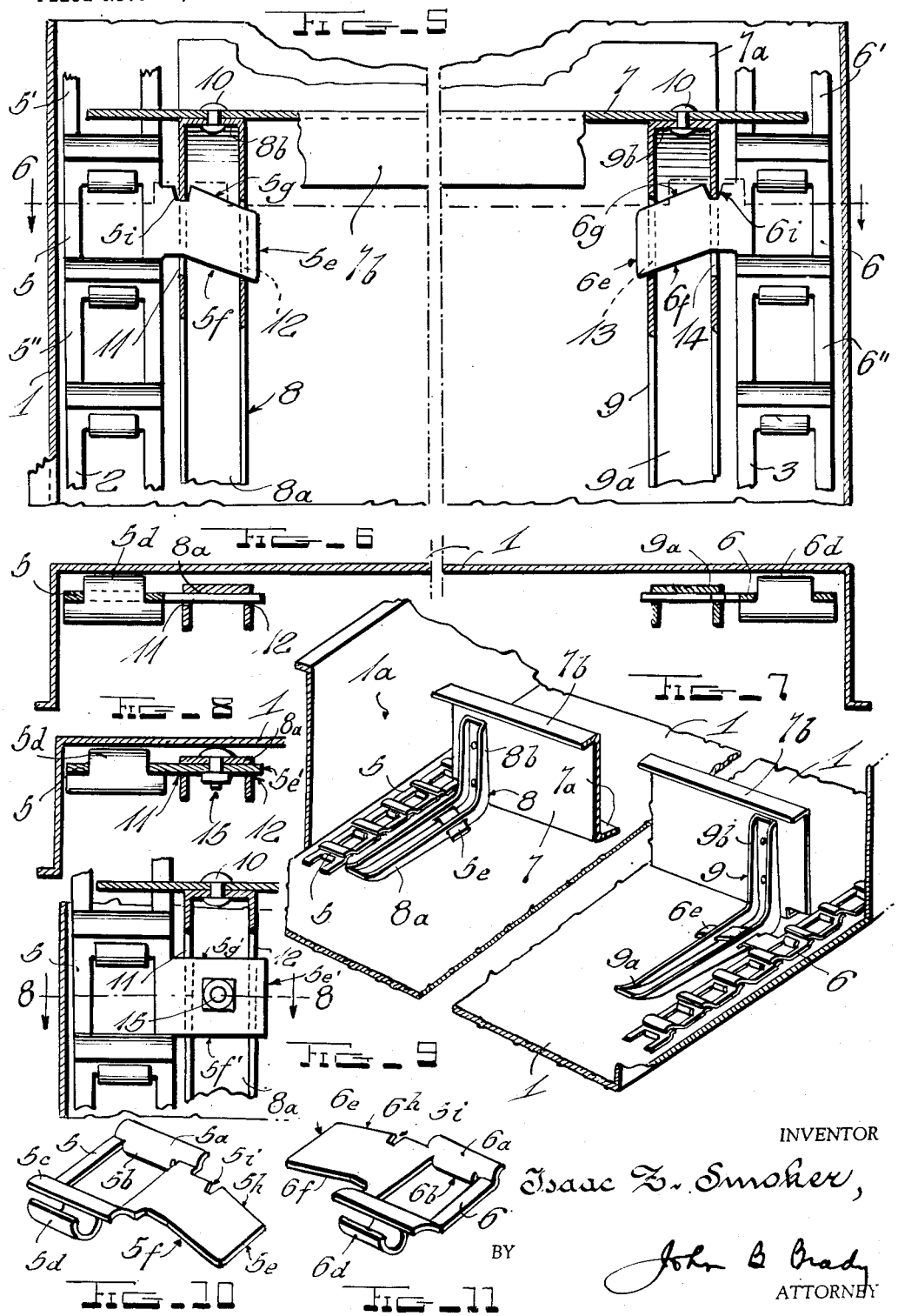

United States Patent Office 2,758,702
Patented Aug. 14, 1956

2,758,702

SLIP ON FLIGHT FOR ENDLESS CONVEYOR

Isaac Z. Smoker, Intercourse, Pa.

Application November 26, 1952, Serial No. 322,638

3 Claims. (Cl. 198—175)

My invention relates broadly to endless conveyors and more particularly to an arrangement for variously spacing flights along the endless conveyor for application of the conveyor to different types of loads.

One of the objects of my invention is to provide a construction of endless conveyor of the sprocket-chain type having means for detachably and attachably connecting flights at various positions along the sprocket chains to accommodate the conveyor to different types of loads which require different spacings for the flights.

Another object of my invention is to provide a construction of endless conveyor of the sprocket-chain type in which transversely aligned links of the chains are provided with inwardly directed projections over which the flights are adapted to be attachably and detachably engaged for selecting the spatial relation of the flights along the chains for loading different types of crops which require differential spacing of the flights along the conveyor.

Another object of my invention is to provide a construction of elevator of the endless conveying type in which aligned links of the sprocket chains of the elevator are provided with inwardly directed projections which slidably and detachably receive flights having means which slip on to the projections enabling the flights to be maintained in interlocking relation with the sprocket chains.

Still another object of my invention is to provide an arrangement of slip-on flight for endless conveyors including brackets carried by flights with aligned transverse slots therein through which extensions carried by the endless chains are slidably and detachably projected through the slots for detachably maintaining the flights in position.

Still another object of my invention is to provide an arrangement of notched projections on transversely aligned links of an elevator adapted to detachably interlock with transversely aligned slots in coacting means supported by attachable flights detachably engageable along the elevator.

Other and further objects of my invention reside in a structure for establishing detachable connection between flights and the chains of an endless conveyor as set forth more fully in the specification hereinafter following by reference to the accompanying drawings, in which:

Figure 1 is a perspective view showing the application of the structure of my invention to an endless conveyor where the flights are closely spaced for elevating crops of the nature of ear corn, grain, etc.; Fig. 2 is a view similar to the view shown in Fig. 1 but illustrating the flights more widely spaced by reason of the removal of every other flight in the conveyor for thus adapting the conveyor for handling bales, bags, sacks, etc., having an effective length exceeding the distance between flights in the arrangement shown in Fig. 1; Fig. 3 is a vertical sectional view taken through 2 adjacent flights of the conveyor arranged in accordance with my invention; Fig. 4 is a plan view of a fragmentary portion of a conveyor illustrating two of the removable flights in position on the conveyor with the flights partially broken away and shown in section and illustrating the brackets thereof in section; Fig. 5 is a top plan view on an enlarged scale of a fragmentary portion of the conveyor positioned in a trough and illustrating the flight detachably mounted on the conveyor with parts of the flight and the supporting brackets thereof illustrated in section, the flight and trough being laterally foreshortened; Fig. 6 is a transverse sectional view taken on line 6—6 of Fig. 5; Fig. 7 is a perspective view illustrating the manner of detachably mounting a flight with respect to the sprocket chains of the endless conveyor operating in a conveyor trough, the trough and flight being laterally foreshortened; Fig. 8 is a fragmentary transverse sectional view through a modified structure of link, as shown in Fig. 9, the view being taken on line 8—8 of Fig. 9; Fig. 9 is a view of the modified structure of link illustrated in Fig. 8; Fig. 10 is a perspective view of one of the lefthand links of preferred construction embodying my invention; and Fig. 11 is a perspective view of one of the right-hand links embodying my preferred construction.

My invention is directed to an improved construction of endless conveyors for elevators adapted for use with various types of loads. It is often necessary to utilize endless-chain loading and unloading elevators for different types of loads, for example, hay bales and/or grain or ears of corn or other produce. In utilizing the elevator for hay hales, it is desirable to have the flights spaced more widely than the spacing for such flights when used for elevating grain or corn cobs or other produce. In accordance with the present invention, the flights are arranged for detachable or slip-on connection with respect to the sprocket chains constituting the elevator. Hence every other flight may be removed from the elevator when the elevator is to be used for handling bales of hay, and the intermediate flights may be readily re-installed when the elevator is to be used for handling grain or ears of corn. The slip-on connection is accomplished by forming projections on transversely aligned links of the sprocket chains where the projections are arranged to extend through transversely aligned slots in brackets which support the flights. The projections are coplanar and extend at acute angles to the path of travel of the sprocket chains and enter the aligned slots in the supporting means for the flights.

In order to eliminate the danger of the flights becoming disengaged from the sprocket chains, I provide interconnecting recesses in the projections adapted to establish connection with one edge of one of the slots in the flight-supporting bracket while the oppoiste coacting edge of the projection abuts against the diagonally opposite edge in the adjacent slot in the bracket support. Thus an interlocked detachable slip-on connection is provided between the flight and the chains enabling the flight to be readily attached or detached at selected spaced positions along the conveyor.

I have found the slip-on feature according to my invention herein highly desirable and efficient in operation. I realize that the attachable and detachable connection may be carried out in a variety of ways, and I desire that my invention as set forth herein be considered in the illustrative sense and not in the limiting sense.

Referring more particularly to the drawings, Fig. 1 illustrates an elevator of the endless-chain type which includes the trough 1 through which the link chains 2 and 3 extend in an upwardly advancing path and return in a lower path designated at 2' and 3'. The lower course of the link chains 2' and 3' is supported at spaced intervals by transverse bars indicated at 4. The link chains 2 and 3 have, at transversely aligned positions thereon, links 5 and 6, shown more particularly in Figs. 10 and 11. These particular links 5 and 6 are left- and right-hand attachment links, respectively. Attachment link 5 terminates in its upper transverse edge in a partially rounded transverse lip 5a on the front thereof and a partially rounded transverse lip 5b on the bottom thereof. The lower transverse edge of link 5 has an upper rounded transverse lip designated at 5c and a lower curved lip represented at 5d. These transverse lips of link 5 coact with complementary-shaped lips on adjacent links represented in Fig. 5, for example, at 5' and 5" whereby the successive links of the endless conveyor are flexibly interconnected. Similarly the link 6 is provided with an upper transversely curved lip 6a and a lower transversely curved lip 6b at the upper extremity thereof while the lower extremity of the link 6 is provided with a transversely curved lip 6c and a coacting transversely curved lip 6d whereby a flexible connection may be made with coacting links 6' and 6" of the endless conveyor at the right of the conveyor as distinguished from the arrangement at the left of the conveyor previously described.

The links 5 and 6 each have inwardly directed, downwardly disposed projections 5e and 6e thereon. These projections extend downwardly at angles of approximately 15 degrees with respect to a transverse axis through the centers of the links 5 and 6. The projections 5e and 6e have linearly extending substantially parallel edges, the lower edges 5f and 6f of which are disposed at angles with respect to the transverse axes of the lips 5c and 5d and 6c and 6d. The upper edges 5g and 6g are linear and are declined downwardly in direction substantially parallel with the edges 5f and 6f and in positions immediately adjacent the inner edges of the links 5 and 6 from which the projections 5e and 6e extend which are provided with substantially V-shaped notches represented at 5i and 6i. The arrangement of downwardly inclined edges 5f, 6f, 5h and 6h on the projections and the locations of the notches 5i and 6i in the upper edges 5g and 6g are important as these determine the ease with which the detachable flight may be assembled on or removed from the endless conveyor.

The removable and insertable flights have been indicated at 7, each consisting of a metallic member of substantially Z-shaped section extendable between the side walls 1a and 1b of the trough 1 in the nature of a shelf for providing a support for the produce or for bales, etc. Each flight 7 is mounted upon a pair of spaced brackets 8 and 9 having arms of unequal length, the brackets being displaced from the opposite ends of the flights for a distance sufficient to permit the longer arms indicated at 8a and 9a to clear the links of the chains at 5 and 6 and extend in substantial alignment adjacent thereto to frictionally slide in the nature of runners along the bottom of the trough 1, while the shorter arms 8b and 9b are riveted, as indicated at 10, to the under side of the flight 7.

The flight 7 of the substantially Z-shaped section has the rear edge 7a thereof foreshortened to clear the links of the linked chains, as represented at 5 and 6, and to frictionally slide against the bottom surface of the trough 1 as the chains move with respect thereto. The outside edge 7b of the flight 7 extends substantially the full width of the conveyor trough and structurally stiffens the flight for supporting the load which is elevated.

The brackets 8 and 9 are of channel-shaped structure for increasing the rigidity thereof and the longer arms 8a and 8b have the oppiste transverse side walls thereof slotted, as represented at 11 and 12 and 13 and 14. These slots are disposed in the channel-shaped side walls of the longer arms at 8a and 9a immediately behind the surfaces of the brackets which serve as runners operating against the surface of trough 1. These slots are disposed from the lower surface of the flight 7 for a distance substantially one-half of the length of the links of the chains which enables the projections 5e and 6e on links 5 and 6 to be readily inserted therethrough.

The flights are detachably secured in position on projections 5e and 6e by raising the link chains 5 and 6 sufficiently to clear the sides 1a and 1b of the trough 1 by use of a suitable tool and then inserting the slotted brackets 8 and 9 of the flight 7 first over one projection such as 5e and then over the other projection such as 6e. As each projection is inserted the link chain is allowed to fall back in position in the trough 1 carrying the detachable flight therewith.

In certain forms of my invention, the projections on the links extend transversely toward each other and are not downwardly inclined as represented in Figs. 8 and 9. In this form of my invention the projections for the link 5 are illustrated at 5e' having parallel extending sides 5g' and 5f' which extend transversely toward the complementary projection on the oppositely aligned link for chain 6. The sides of the projection in this arrangement are not inclined downwardly and do not include the V-shaped notch. However, the projections, such as 5e', extend through slots 11 and 12, for example, and the projection is fastened by means of bolt 15 which passes through the arm 8a of bracket 8. The projection 5e' and the corresponding projection on the link connected with chain 6 is apertured for the passage of the securing bolt 15. Thus the detachable flight may be secured to projections on the links of the form of my invention shown in Figs. 8 and 9.

It will be readily understood that under conditions where the conveyor is to be used in the loading or unloading of corn, grain, or sacks or bags that the flights are attached to the conveyor at relatively closely spaced intervals as represented in Fig. 1; whereas, under conditions where the elevator is to be used for the loading of bales, the flights are more widely spaced as represented in Fig. 2. The attachment and detachment of the flights may be accomplished rapidly and easily.

The interlock which is established by the engagement of the opposite edges of the projections with the slots 11, 12, 13 and 14 in the brackets 8 and 9, respectively, insures substantial support for the flights. That is to say, the projections 5e and 6e extend at an acute angle with respect to a line drawn transversely to the path of movement of the chains. The projections thus establish a wedging connection with the coacting slots so that V-shaped notch 5i in the peripheral edge 5g interlocks with the top extremity of slot 11 while the edge 5f of projection 5e establishes wedging connection with the lower end of slot 12. Similarly, V-shaped notch 6i engages the top extremity of slot 14 while the lower edge 6f of projection 6e engages the lower extremity of slot 13. Thus substantial wedging connection is obtained where the projections 5e and 6e extend downwardly at an acute angle to a transverse line through the direction of travel, the projections being inclined on axes which intersect along the central axis of the conveyor displaced below each flight away from the direction of travel.

The structure of the sprocket chains is such that the rounded faces 5d and 6d establish sliding contact with the bottom of the trough 1. Thus the sprocket chains slide over the surface of the trough 1 as represented more clearly in Fig. 3 with the rounded surfaces 5d and 6d providing minimum frictional resistance with the bottom surface of the trough 1. The runners provided by the arms 8a and 9a of brackets 8 and 9 also facilitate movement of the loaded flights with respect to the trough 1. Moreover, the trailing edges 7a of each of the flights are either suspended above out of contact with the surface of trough 1 or the sliding contact established therewith is such that minimum resistance forces are introduced.

While I have described my invention in certain of its preferred embodiments, I realize that modifications may be made, and I desire that it be understood that no limitations upon my invention are intended other than may be embodied by the scope of the appended claims.

What I claim as new and desire to secure by Letters Patent of the United States is as follows:

1. An attachable and detachable flight and endless conveyor, of the type comprising a pair of substantially flat spaced sprocket chains having transversely aligned sprockets links each having inwardly and downwardly inclined projections directed toward each other, a flight extending between said transversely aligned sprocket links, means on the flight coacting with means on said inwardly and downwardly inclined projections for slidably and detachably mounting said flight with respect to the transversely aligned sprocket links, the means on said flight and the means on said projections being disposed in substantially coplanar relationship, and wherein said projections are each inclined at an acute angle to the path of travel of the sprocket chains and wherein the means on the flight coacting with the means on said projections for slidably and detachably mounting the flights with respect to the chains comprise brackets of channel-shaped section having aligned slots in opposite side walls thereof, said projections being slidable through said slots, said projections each being recessed along one peripheral edge thereof for establishing detachable interlocking connection with the edge of the slot in one wall of the bracket of channel-shaped section through which the projection extends.

2. An attachable and detachable flight and endless conveyor, of the type comprising a pair of substantially flat spaced sprocket chains having transversely sligned sprocket links each having inwardly and downwardly inclined projections directed toward each other, a flight extending between said transversely aligned sprocket links, means on the flight coacting with means on said inwardly and downwardly inclined projections for slidably and detachably mounting said flight with respect to the transversely aligned sprocket links, the means on said flight and the means on said projections being disposed in substantially coplanar relationship, and wherein the projections on the transversely aligned links on the chains are flat and extend at an acute angle with respect to the path of movement of the sprocket chains and wherein the means on the flight coacting with means on the projections for slidably and detachably mounting said flight with respect to said chains comprise bracket members containing slots for receiving said angularly disposed projections and wherein said projections each contain a V-shaped notch in the upper peripheral edge thereof adjacent the associated link in a position in said projection opening toward the direction of travel of the sprocket chain.

3. An attachable and detachable flight and endless conveyor, of the type comprising a pair of substantially flat spaced sprocket chains having transversely aligned sprocket links each having inwardly and downwardly inclined projections directed toward each other, a flight extending between said transversely aligned sprocket links, means on the flight coacting with means on said inwardly and downwardly inclined projections for slidably and detachably mounting said flight with respect to the transversely aligned sprocket links, the means on said flight and the means on said projections being disposed in substantially coplanar relationship, and wherein the projections on the transversely aligned links on the chains are flat and extend at an acute angle with respect to the path of movement of the sprocket chains and wherein the means on the flight coacting with means on the projections for slidably and detachably mounting said flight with respect to the chains comprise bracket members containing slots for receiving said angularly disposed projections and wherein said projections each contain a V-shaped notch in the upper peripheral edge thereof adjacent the associated link in a position in said projection opening toward the direction of travel of the sprocket chain and forming a fastening means for mounting said flight with respect to said links.

References Cited in the file of this patent
UNITED STATES PATENTS

| | | |
|---|---|---|
| 542,996 | Dick | July 23, 1895 |
| 1,405,419 | Joy | Feb. 7, 1922 |
| 2,435,768 | Biggs | Feb. 10, 1948 |
| 2,544,191 | Tomfohrde | Mar. 6, 1951 |
| 2,546,262 | Hatcher | Mar. 27, 1951 |